United States Patent
Yu et al.

(10) Patent No.: US 8,700,552 B2
(45) Date of Patent: Apr. 15, 2014

(54) EXPLOITING SPARSENESS IN TRAINING DEEP NEURAL NETWORKS

(75) Inventors: Dong Yu, Bothell, WA (US); Li Deng, Redmond, WA (US); Frank Torsten Bernd Seide, Beijing (CN); Gang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 13/305,741

(22) Filed: Nov. 28, 2011

(65) Prior Publication Data
US 2013/0138589 A1    May 30, 2013

(51) Int. Cl.
G06F 15/18    (2006.01)
G06N 3/08    (2006.01)

(52) U.S. Cl.
USPC .......................................................... 706/25

(58) Field of Classification Search
None
See application file for complete search history.

(56) References Cited

U.S. PATENT DOCUMENTS

| | | | |
|---|---|---|---|
| 5,687,286 A | 11/1997 | Bar-Yam | |
| 5,799,276 A | 8/1998 | Komissarchik et al. | |
| 5,862,519 A | 1/1999 | Sharma et al. | |
| 6,128,609 A | 10/2000 | Rose | |
| 7,444,282 B2 | 10/2008 | Choo et al. | |
| 2009/0216528 A1 | 8/2009 | Gemello et al. | |
| 2009/0287624 A1 | 11/2009 | Rouat et al. | |

OTHER PUBLICATIONS

Yu, D., L. Deng, Deep learning and its applications to signal and information processing, IEEE Signal Processing Magazine, Jan. 2011, vol. 28, No. 1, pp. 145-154.

Duch, W., J. Korczak, Optimization and global minimization methods suitable for neural networks, Neural Computing Surveys, vol. 2, Dec. 1998, pp. 1-41.

Dahl, G. E., D. Yu, L. Deng, A. Acero, Context-dependent pre-trained deep neural networks for large-vocabulary speech recognition, IEEE Transactions on Audio, Speech & Language Processing, Jan. 2012, vol. 20, No. 1, pp. 30-42.

Yu, D., Y.-C. Ju, Y.-Y. Wang, G. Zweig, A. Acero, Automated directory assistance system—From theory to practice, 8th Annual Conf. of the Int'l Speech Communication Association, Aug. 2007, pp. 2709-2712, Antwerp, Belgium.

(Continued)

*Primary Examiner* — Kakali Chaki
*Assistant Examiner* — Ababacar Seck
(74) *Attorney, Agent, or Firm* — Steve Wight; Carole Boelitz; Micky Minhas

(57) ABSTRACT

Deep Neural Network (DNN) training technique embodiments are presented that train a DNN while exploiting the sparseness of non-zero hidden layer interconnection weight values. Generally, a fully connected DNN is initially trained by sweeping through a full training set a number of times. Then, for the most part, only the interconnections whose weight magnitudes exceed a minimum weight threshold are considered in further training. This minimum weight threshold can be established as a value that results in only a prescribed maximum number of interconnections being considered when setting interconnection weight values via an error back-propagation procedure during the training. It is noted that the continued DNN training tends to converge much faster than the initial training.

20 Claims, 3 Drawing Sheets

(56) References Cited

OTHER PUBLICATIONS

Hassibi, B., D. G. Stork, Second order derivatives for network pruning, Optimal brain surgeon, Advances in Neural Information Processing Systems, Nov. 30-Dec. 3, 1992, pp. 164-171, Denver, Colorado, USA.

Renals, S., N. Morgan, H. Bourlard, M. Cohen, and H. Franco, Connectionist probability estimators in HMM speech recognition, IEEE Trans. Speech and Audio Processing, Jan. 1994, vol. 2, No. 1, pp. 161-175.

Fritsch, J., M. Finke, ACID/HNN: clustering hierarchies of neural networks for context-dependent connectionist acoustic modeling, Proc. of the 1998 IEEE Int'l Conf. on Acoustics, Speech and Signal Processing, May 1998, pp. 505-508 vol. 1, Seattle, WA, USA.

Saul, L. K., T. Jaakkola, M. I. Jordan, Mean field theory for sigmoid belief networks, J. Artif. Intell. Res., Jan. 1996, vol. 4, pp. 61-76.

Hinton, G. E., R. R. Salakhutdinov, Reducing the dimensionality of data with neural networks, Science, Jul. 2006, vol. 313, No. 5786, pp. 504-507.

Langford, J., L. Li, T. Zhang, Sparse online learning via truncated gradient, J. of Machine Learning Research, Dec. 2009, vol. 10, pp. 777-801.

Zweig, G., P. Nguyen, A segmental CRF approach to large vocabulary continuous speech recognition, IEEE Workshop on Automatic Speech Recognition & Understanding, Nov. 13-Dec. 17, 2009, pp. 152-157.

Seide, F., G. Li, D. Yu, Conversational speech transcription using context-dependent deep neural networks, Interspeech 2011, 12th Annual Conf. of the Int'l Speech Communication Association, Aug. 2011, pp. 437-440, Florence, Italy.

Peterson, C., J. R. Anderson, A mean field theory learning algorithm for neural networks, Complex Systems, vol. 1, No. 5, 1987, pp. 995-1019.

LeCun, Y., J. S. Denker, S. A. Solla, Optimal brain damage, Advances in Neural Information Processing Systems, NIPS, Nov. 1989, pp. 598-605, Denver, Colorado, USA.

Seide, F., Gang Li, G., X. Chen, and D. Yu, Feature engineering in context-dependent deep neural networks for conversational speech transcription, Automatic Speech Recognition and Understanding, Dec. 2011.

EXPLOITING SPARSENESS IN TRAINING DEEP NEURAL NETWORKS

BACKGROUND

A trained deep neural network (DNN) is known to be a powerful discriminative modeling tool, and can be used for a variety of purposes. For example, a DNN can be combined with a hidden Markov model (HMM) to characterize context-dependent (CD) phones as pronunciation units of speech. The resulting hybrid CD-DNN-HMM takes advantage of the temporally localized discriminative modeling power of a DNN and the sequential modeling power of a HMM. A CD-DNN-HMM can be used in speech recognition systems, handwriting recognition systems, and human activity recognition/detection systems, among many others.

One of the key procedures in building such CD-DNN-HMMs is the training of the DNN. DNNs are computationally demanding to train because of the large number of parameters involved and because much of the computation is shared across states which cannot be done on demand. Only recently has training DNNs become feasible owing to easy access to high-speed general purpose graphical processing units (GPGPUs), and the development of effective DNN layer weight initialization techniques.

SUMMARY

Deep Neural Network (DNN) training technique embodiments described herein generally train a DNN while exploiting the sparseness of non-zero hidden layer interconnection weight values. In one exemplary DNN training technique embodiment, a DNN is trained by initially training a fully interconnected DNN. To this end, a set of training data entries are accessed. Each data entry is then input one by one into the input layer of the DNN until all the data entries have been input once to produce an interimly trained DNN. Generally, after inputting of each data entry, a value of each weight associated with each interconnection of each hidden layer is set via an error back-propagation procedure so that the output from the output layer matches a label assigned to the training data entry. The foregoing process is then repeated a number of times to produce the initially trained DNN.

Those interconnections associated with each layer of the initially trained DNN whose current weight value exceeds a minimum weight threshold are identified next. Each data entry is then input again one by one into the input layer until all the data entries have been input once to produce a refined DNN. In this case, after the inputting of each data entry, the value of each weight associated with each of the identified interconnections of each hidden layer is set via an error back-propagation procedure so that the output from the output layer matches the label assigned to the training data entry. This action of inputting each data entry is then repeated a number of times to produce the trained DNN.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
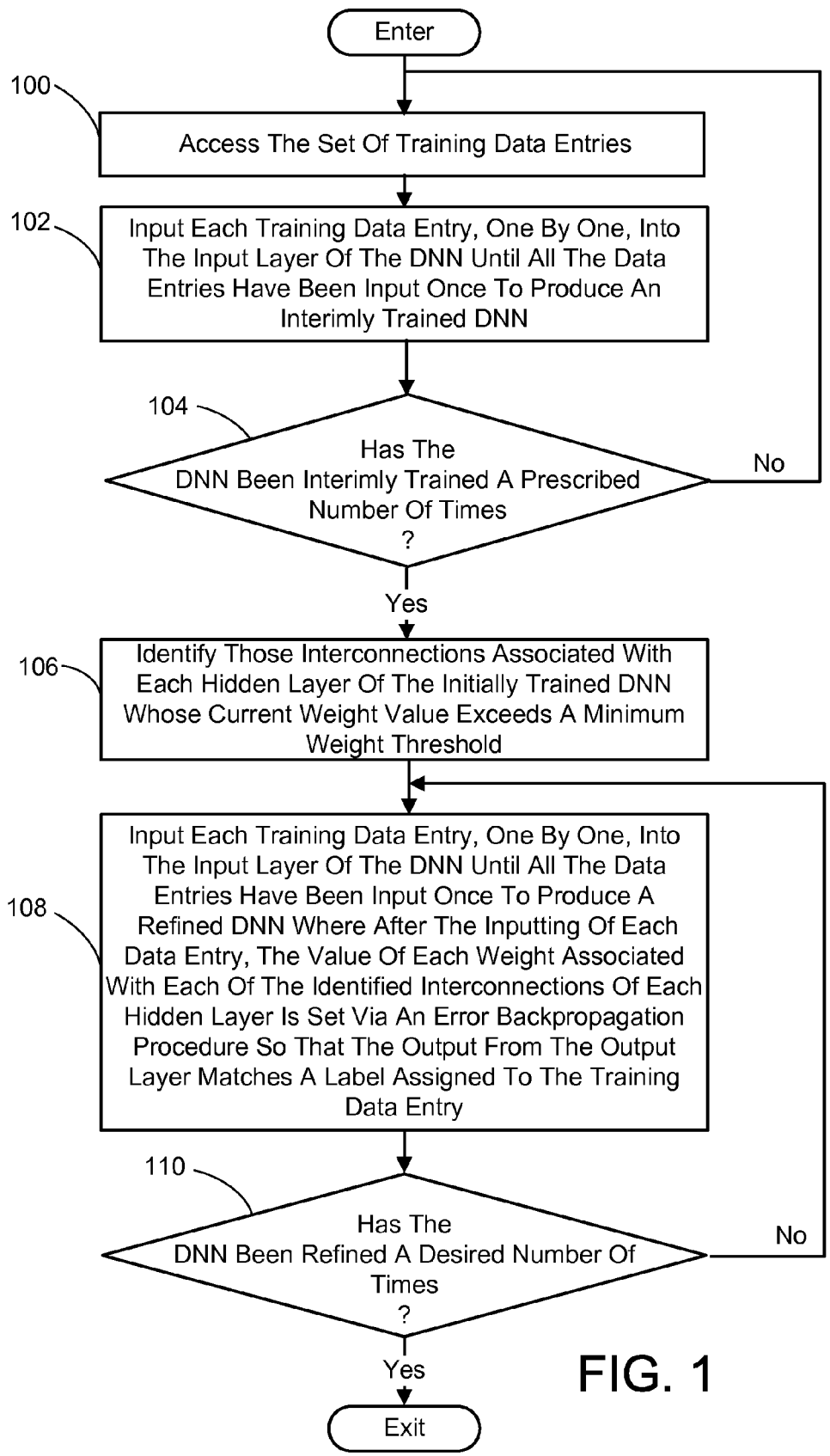
FIG. 1 is a flow diagram generally outlining one implementation deep neural network (DNN) training process that exploits the sparseness of non-zero hidden layer interconnection weight values.

In the following description of Deep Neural Network (DNN) training technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Sparseness-Exploiting Deep Neural Network Training

Deep Neural Network (DNN) training technique embodiments described herein generally train a DNN while exploiting the sparseness of non-zero hidden layer interconnection weight values. For the purposes of this description, a completed DNN is defined as a neural network having more than one hidden layer.

A trained DNN can be used for a variety of purposes. For example, as indicated previously, a DNN can model context-dependent (CD) phones and can be combined with a hidden Markov model (HMM). The resulting hybrid CD-DNN-HMM takes advantage of the discriminative modeling power of a DNN with the sequential modeling power of a HMM. A CD-DNN-HMM can be used in speech recognition systems, handwriting recognition systems, and human activity recognition/detection systems, among many others. In the case of a speech recognition system, such as is used in a voice search task or switchboard phone-call transcription task, a CD-DNN-HMM is used to directly model senones (tied CD phone states) and approximates the emission probabilities of these senones in a HMM speech recognizer. A senone represents clustered (or tied) triphone states. However, it is not intended that the DNN training technique embodiments described herein be limited to speech recognition systems, or any of the other above-mentioned systems. Rather, the DNN training technique embodiments described herein can be employed with any DNN used for any purpose.

1.1 Deep Neural Network

DNNs can be considered as conventional multi-layer perceptrons (MLPs) with many hidden layers. Specifically, a DNN models the posterior probability $P_{s|o}(s|o)$ of a class s given an observation vector o, as a stack of (L+1) layers of log-linear models. The first L layers, $l=0 \ldots L-1$, model hidden binary output units $h^l$ given input vectors $v^l$ as Bernoulli distribution $$P_{h/v}^l(h^l | v^l) = \prod_{j=1}^{N^l} \frac{e^{z_{j(v^l)}^l h_j^l}}{e^{z_{j(v^l),1}^l} + e^{z_{j(v^l),0}^l}}, \quad 0 \leq l < L \qquad (1)$$

and the top layer L models the desired class posterior as multinomial distribution $$P_{s/v}^l(s | v^l) = \frac{e^{z_{s(v^l)}^l}}{\sum_{s'} e^{z_{s'(v^l)}^l}} = \text{softmax}_s(z^L(v^L)) \qquad (2)$$

where $z^l(v^l)=(W^l)^T v^l+a^l$ is the activation at layer l, $W^l$ and $a^l$ are the weight matrices and bias vectors at layer l, and $h_j^l$ and $z_j^l(v^l)$ are the j-th component of $h^l$ and $z^l(v^l)$, respectively.

The precise modeling of $P_{s|o}(s|o)$ is infeasible as it requires integration over all possible values of $h^l$ across all layers. An effective practical trick is to replace the marginalization with a mean-field approximation. Given observation o, $v^l=$o is set and conditional expectation $E_{h_l|v}\{h^l|v^l\}=\sigma(z^l(v^l))$ is chosen as input $v^{l+1}$ to the next layer, where $\sigma_j(z)=1/(1+e^{-z_j})$ is sigmoid function.

1.2 Training a Deep Neural Network

DNNs, being 'deep' MLPs, can be trained with the well-known error back-propagation (BP) procedure. Because BP can easily get trapped in poor local optima for deep networks, it is helpful to 'pretrain' the model in a layer growing fashion as will be described shortly. However, before describing this pretraining it would be useful to briefly describe BP. MLPs are often trained with the error back-propagation procedure with stochastic gradient ascent $$(W^l, a^l) \leftarrow (W^l, a^l) + \epsilon \frac{\partial D}{\partial (W^l, a^l)}, \quad 0 \leq l \leq L, \qquad (3)$$

for an objective function D and learning rate ϵ. Typically, the objective is to maximize the total log posterior probability over the T training samples O={o(t)} with ground-truth labels s(t), i.e.

$$D(O)=\Sigma_{t=1}^T \log P_{s|o}(s(t)|o(t)), \qquad (4)$$

then the gradients are $$\frac{\partial D}{\partial W^l} = \sum_t v^l(t)(\omega^l(t)e^l(t))^T;$$

$$\frac{\partial D}{\partial a^l} = \sum_t \omega^l(t)e^l(t)$$

$$e^L(t) = (\log \text{softmax})'(z^L(v^L(t)))$$

$$e^{l-1}(t) = W^l \cdot \omega^l(t) \cdot e^l(t) \text{ for } 0 \leq l < L$$

$$\omega^l(t) = \begin{cases} \text{diag}(\sigma'(z^l(v^l(t)))) & \text{for } 0 \leq l < L \\ 1 & \text{else} \end{cases}$$

(5)

with error signals $e^l(t)=\partial D/\partial v^{l+1}(t)$ as back-propagated from networks l+1 and above; network l's output-nonlinearity's derivative $\omega^l(t)$ if present; component-wise derivatives $\sigma'_j(z)=\sigma_j(z)\cdot(1-\sigma_j(z))$ and $(\log \text{softmax})'_j(z)=\delta_{s(t),j}-$ softmax$_j(z)$;

and Kronecker delta δ.

1.3 Exploiting Sparseness

The DNN training technique embodiments described herein operate as a computer-implemented process for training a DNN. This can involve employing a computer-readable storage medium having computer-executable instructions stored thereon for achieving the training. Suitable computing devices and storage media will be described in more detail in the Exemplary Operating Environments section to follow.

It has been found that recognition accuracy of DNNs increases with the number of hidden units and layers, if the training process is controlled by a held-out set. Resulting optimal models, however, are large. Fortunately, inspection of fully connected DNNs after the training has shown that a large portion of the interconnections have very small weights. For example, the distribution of weight magnitudes of a typical 7-hidden-layer DNN has been found to have about 87% of their interconnection weight magnitudes below 0.2 and 70% of their interconnection weight magnitudes below 0.1. As such, it can be advantageous to reduce the DNN model size by removing interconnections with small weight magnitudes so that deeper and wider DNNs can be employed more effectively. Note that similar observations patterns were not found in the case of the DNN bias parameters. This is expected since nonzero bias terms indicate the shift of hyperplanes from the origin. Since the number of bias parameters is only about 1/2000 of the total number of parameters, keeping bias parameters intact does not affect the final model size in a noticeable way.

1.3.1 Convex Constraint Formulation

Generally, DNN training technique embodiments described herein are formulated as a multi-objective optimization problem in which the aforementioned log conditional probability D is maximized, while at the same time the number of non-zero weights is minimized. This two-objective optimization problem can be converted into a single objective optimization problem with convex constraint formulations.

More particularly, the log conditional probability D is subject to the constraint $$\|W\|_o \leq q \qquad (6)$$

where q is a threshold value for the maximal number of nonzero weights allowed.

This constrained optimization problem is hard to solve. However, an approximate solution can be found following two observations: First, after sweeping through the full training set several times the weights become relatively stable—i.e., they tend to remain either large or small magnitudes. Second, in a stabilized model, the importance of the connection is approximated well by the magnitudes of the weights (times the magnitudes of the corresponding input values, but these are relatively uniform within each layer since on the input layer, features are typically normalized to zero-mean and unit-variance, and hidden-layer values are probabilities).

In simplified terms, this leads to a simple yet effective procedure for training a "sparse" DNN. Generally, a fully connected DNN is trained by sweeping through the full training set a number of times. Then, for the most part, only the interconnections whose weight magnitudes are in top q are considered in further training. Other interconnections are removed from the DNN. It is noted that the training is continued after pruning the interconnections because the log conditional probability value D is reduced due to connection pruning, especially when the degree of sparseness is high (i.e., q is small). However, the continued DNN training tends to converge much faster than the original training.

More particularly, referring to FIG. 1, in one implementation, the DNN training involves using a computing device (such as one described in the Exemplary Operating Environments section to follow) to execute the following process actions. First, a fully interconnected DNN is initially trained by accessing a set of training data entries (process action 100). This set of training data entries could correspond to a so-called mini-batch as is known in the neural network training arts. In addition, a fully interconnected DNN is defined as one including an input layer into which training data is input, an output layer from which an output is generated, and a plurality of hidden layers. Each data entry is then input one by one into the input layer of the DNN until all the data entries have been input once to produce an interimly trained DNN (process action 102). Generally, after inputting of each data entry, a value of each weight associated with each interconnection of each hidden layer is set via an error back-propagation procedure (such as described previously) so that the output from the output layer matches a label assigned to the training data entry. For example, when the DNN being trained is part of a previously-described CD-DNN-HMM used in speech recognition systems, accessing the set of training data entries involves accessing a set of speech frames each of which has a corresponding senone label assigned to it. In addition, inputting each speech frame into the input layer until all the data entries have been input once to produce the interimly trained DNN or a refined DNN, involves, after the inputting of each speech frame, setting the values of said weights associated with the interconnections of each hidden layer via the error back-propagation procedure so that the output from the output layer matches the senone label assigned to the speech frame.

The foregoing process is then repeated a number of times to produce an initially trained DNN. To this end, it is determined if process actions 100 and 102 have been repeated a prescribed number of times (process action 104). If not, then actions 100 and 102 are repeated. This continues until it is determined the process has been repeated the prescribed number of times. In one implementation, the prescribed number of times actions 100 and 102 are repeated to establish the initially trained DNN ranges between 5 and 50 which is task dependent.

Next, those interconnections associated with each layer of the initially trained DNN whose current weight value exceeds a minimum weight threshold are identified (process action 106). In one implementation, the minimum weight threshold is established as a value that results in only a prescribed maximum number of interconnections being considered when setting interconnection weight values via the error back-propagation procedure. In another implementation, the prescribed maximum number of interconnections ranges between 10% and 40% of all interconnections.

The aforementioned continued training is then performed on the pruned DNN. More particularly, referring to FIG. 1, each data entry is input one by one into the input layer until all the data entries have been input once to produce a refined DNN (process action 108). In this case, after the inputting of each data entry, the value of each weight associated with each of the identified interconnections of each hidden layer (i.e., the ones exceeding the minimum weight threshold) is set via an error back-propagation procedure so that the output from the output layer matches a label assigned to the training data entry. When the DNN being trained is part of a previously-described speech recognition CD-DNN-HMM, inputting each speech frame into the input layer until all the data entries have been input once involves, after the inputting of each speech frame, setting the values of said weights associated with the previously identified interconnections of each hidden layer via the error back-propagation procedure to produce an output from the output layer that corresponds to the senone label associated with the speech frame.

Process action 108 is then repeated a number of times to produce the trained DNN. To this end, it is determined if process action 108 has been repeated a desired number of times (process action 110). If not, then action 108 is repeated. This continues until it is determined the process has been repeated the desired number of times. In one implementation, the desired number of times action 108 is repeated is established by determining when the interconnection weights associated with the each hidden layer do not vary between iterations by more than a prescribed training threshold. In another implementation, process action 108 is repeated a prescribed number of times (e.g., between 5 and 50 which is task dependent).

1.3.2 Sparseness Constraint Enforcement

It is noted that it is advantageous to enforce the sparseness constraint of Eq (6) to a large extent in the continued training of the "sparse" DNN. One way of keeping the same sparse connections (and thus same sparseness constraint), is to employ a mask where all the pruned interconnections are recorded. The masking approach is cleaner and prevents consideration of all the pruned interconnections in the continued training (and so strictly enforcing the sparseness constraint), but it also requires storage of a huge masking matrix. Another way to enforce the sparseness constraint in the continued training involves rounding interconnection weight values with magnitude below a prescribed minimum weight threshold to zero (e.g., $\min\{0.02, \theta/2\}$ where $\theta$ is the minimal weight magnitude that survived the pruning). Note that only weights smaller than the minimum weight threshold are rounded down to zero--instead of those smaller than $\theta$. This is because the weights may shrink and be suddenly removed, and it is desirable to keep the effect of this removal to minimum without sacrificing the degree of sparseness.

With this latter scenario, if a previously eliminated interconnection exceeds the minimum weight threshold, then it would be considered once again. Though this technically violates the sparseness constrain it has been found that it is a rare occurrence. Similarly, if a non-eliminated interconnection does not exceed the minimum weight threshold, it would be eliminated from consideration in the next training iteration (although it could feasibly exceed the threshold in a future training iteration and be considered once again). This latter scenario also technically violates the sparseness constrain. However, again it was found to be a rare occurrence.

Figure 2:
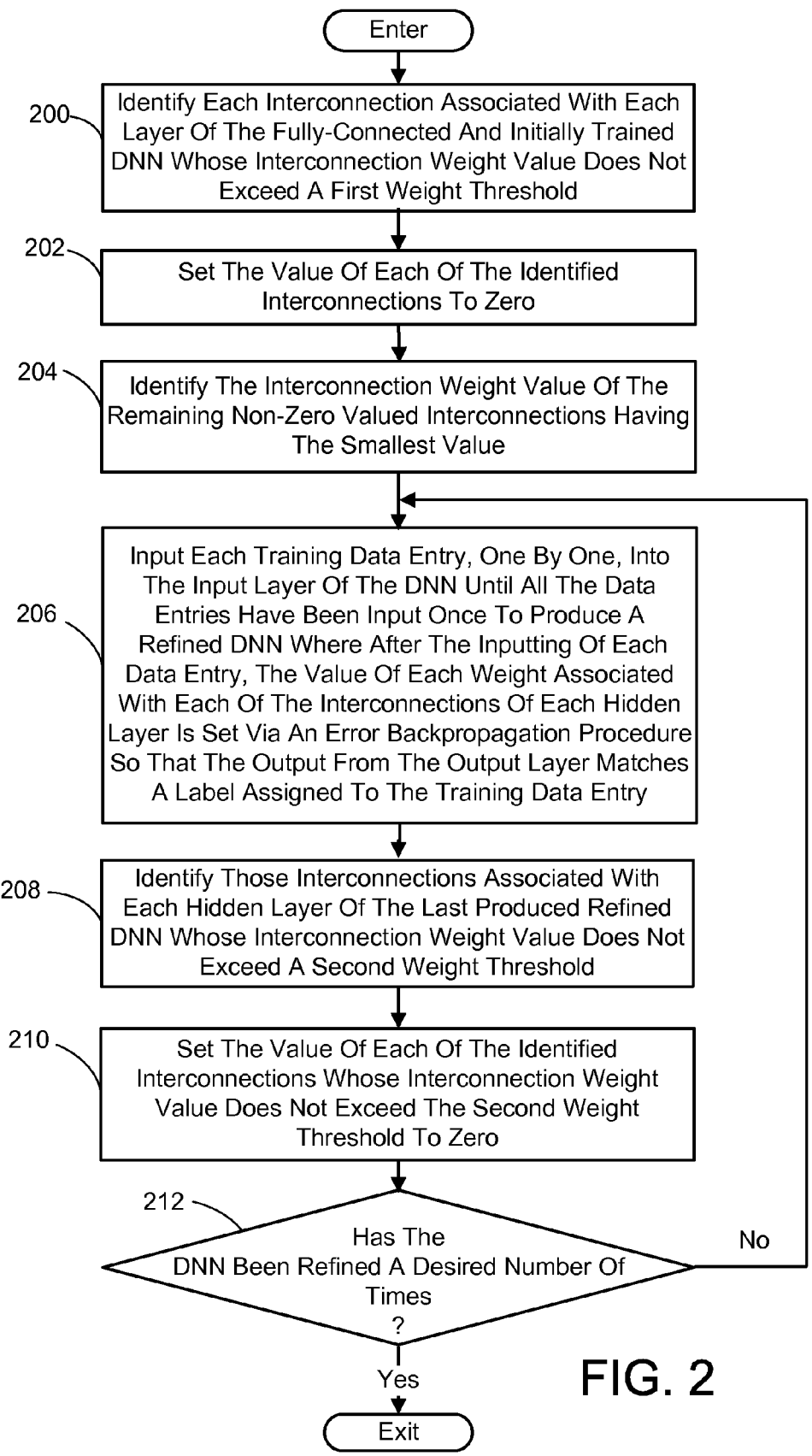
FIG. 2 is a flow diagram generally outlining one implementation of a process for enforcing a sparseness constraint in a continued training of an initially trained DNN that involves rounding interconnection weight values with magnitudes below a prescribed minimum weight to zero.

In view of the foregoing, FIG. 2 outlines one implementation of a process to enforce the sparseness constraint in the continued training that involves rounding interconnection weight values with magnitudes below a prescribed minimum weight to zero. More particularly, a computing device (such as one described in the Exemplary Operating Environments section to follow) is employed to identify each interconnection associated with each layer of the fully-connected and initially trained DNN whose interconnection weight value does not exceed a first weight threshold (process action 200). In one implementation, the first minimum weight threshold is established as a value that results in only a prescribed maximum number of interconnections being considered when setting interconnection weight values via the error back-propagation procedure. In another implementation, the prescribed maximum number of interconnections ranges between 10% and 40% of all interconnections.

The value of each of these identified interconnections is then set to zero (process action 202), and the interconnection weight value of the remaining non-zero valued interconnections having the smallest value is identified (process action 204). Each data entry is input one by one into the input layer until all the data entries have been input once to produce a current refined DNN (process action 206). In this case, after the inputting of each data entry, the values of the weights associated with the interconnections of each hidden layer are set via the error back-propagation procedure so that the output from the output layer matches a label assigned to the training data entry. As before, when the DNN being trained is part of a speech recognition CD-DNN-HMM, inputting each speech frame into the input layer until all the data entries have been input once involves, after the inputting of each speech frame, setting the values of said weights associated with the interconnections of each hidden layer via the error back-propagation procedure to produce an output from the output layer that corresponds to the senone label associated with the speech frame.

Next, those interconnections associated with each hidden layer of the last produced refined DNN whose interconnection weight value does not exceed a second weight threshold are identified (process action 208). In one implementation, the second weight threshold is the lesser of a prescribed minimum weight value (e.g., 0.02) or a prescribed percentage of the previously-identified smallest non-zero interconnection weight value (which percentage for example can range between 20% and 80%). In tested embodiments, 50 percent of the identified smallest non-zero interconnection weight value was used.

The value of each of the identified interconnections whose interconnection weight value does not exceed the second weight threshold is then set to zero (process action 210). Process actions 206 through 210 are then repeated a number of times to produce the trained DNN. To this end, it is determined if process actions 206 through 210 have been repeated a desired number of times (process action 212). If not, then actions 206 through 210 are repeated. This continues until it is determined the process has been repeated the desired number of times. In one implementation, the desired number of times actions 206 through 210 are repeated is established by determining when the interconnection weights associated with the each hidden layer do not vary between iterations by more than a prescribed training threshold. In another implementation, process actions 206 through 210 are repeated a prescribed number of times (e.g., between 5 and 50 which is task dependent).

1.4 Data Structure

The sparse weights learned in the DNN training technique embodiments described herein generally have random patterns. Data structures to effectively exploit the sparse weights to reduce model size and to speed up decoding calculations ($W^T v$) will now be described. In general, it is advantageous to only store and calculate with the nonzero-weights. To speed up the calculation, in one implementation, the indexes and actual weights are stored in adjacent groups so that they can be retrieved efficiently with good locality. A slightly different but almost equally efficient data structure implementation, pairs of indexes and weights are grouped. With the proposed data structure, each column can be multiplied with the input vector in parallel. To further speed up the calculation, parallelization can also be exploited within each column.

Figure 3:
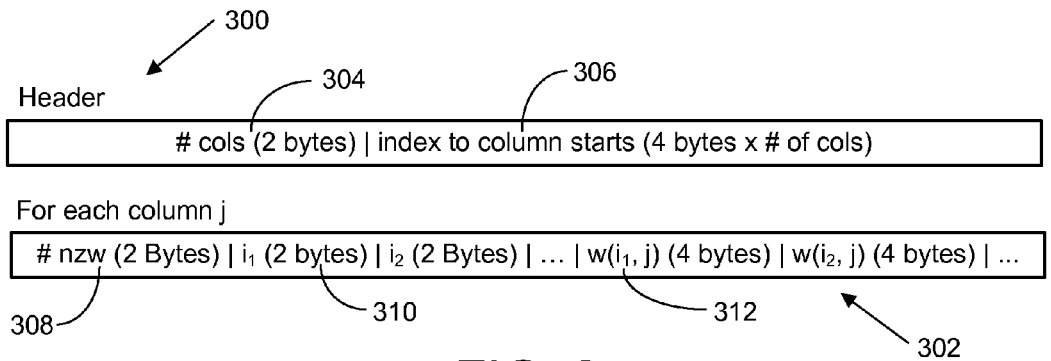
FIG. 3 is a diagram depicting a data structure for storing a weight matrix having a plurality of columns and rows of non-zero weight values associated with interconnections between a pair of layers of a DNN.

One exemplary implementation of such a data structure is depicted in FIG. 3. In this implementation, a computer-readable storage medium is used to store data for access by a deep neural network (DNN) training application program being executed on a computer. The aforementioned data structure is stored in this storage medium and has information used by said DNN training application program. This information generally represents a weight matrix having a plurality of columns and rows of weight values associated with interconnections between a pair of layers of the DNN. More particularly, this data structure includes a header data structure element 300 and a plurality of column data structure elements 302. The header data structure element 300 includes a total columns number 304 representing the number of columns of the weight matrix. This number 304 is followed by a series of column index numbers 306, each of which identifies a location in the data structure where information corresponding to a different one of the plurality of weight matrix columns begins. Each of the column data structure elements 302 generally includes information corresponding to a different one of the plurality of weight matrix columns. More particularly, each of the column data structure elements 302 includes a total non-zero weight value number 308 representing the number of non-zero weight values in the column data structure element. This is followed by a series of row identification numbers 310, each of which identifies a row of the column of the weight matrix corresponding to the column data structure element that is associated with a non-zero weight value. These row identification numbers 310 are then followed by a series of non-zero weight values 312, each of which is assigned to a different one of the rows of the column of the weight matrix corresponding to the column data structure element that is associated with a non-zero weight value.

Note that the data structure shown in FIG. 3 is just one exemplary implementation. The data structure depends heavily on the hardware architecture chosen and the trade-off between storage size and computation speed. For example, the index block $i_k$s can be further compressed by keeping the delta indexes (requires only one byte per index). Furthermore, if streaming SIMD extension (SSE) instructions are used, it is possible to group frames into batches of four and store non-zero weights row-first to achieve similar computation speedup.

The saving of storage from using the data structure shown in FIG. 3 is obvious. For an N×M single-precision matrix with x % nonzero-weights, the normal matrix requires 4×N×M bytes. With the data structure of FIG. 3, it requires 2+6×M (1+x %×N) bytes, which takes less space when x %<2/3−1/N.

The speedup in calculation depends heavily on the implementation and hardware used. For a naive matrix-vector multiplication (i.e., SSE is not used), it requires N×M multiplications and summation, and 2×N×M memory accesses. With the data structure of FIG. 3, it requires only x %×N×M multiplications and summations, and 3×x %×N×M memory accesses.

2.0 Exemplary Operating Environments

Figure 4:
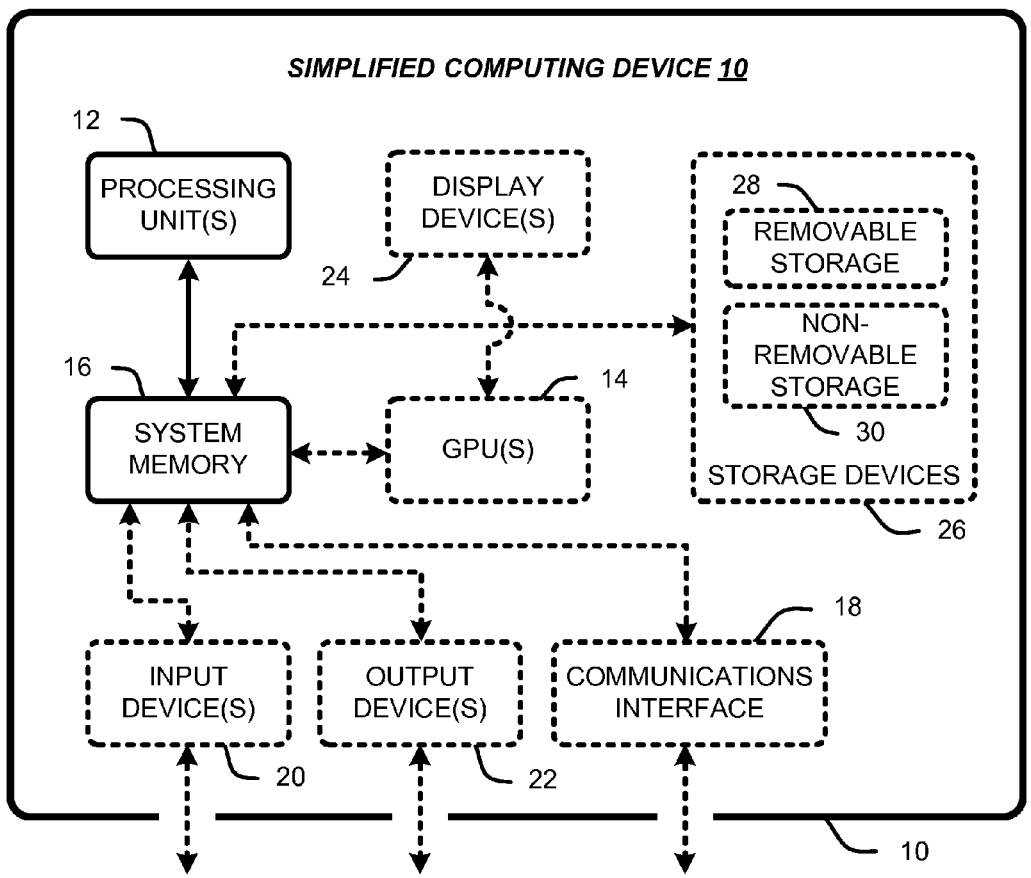
FIG. 4 is a diagram depicting a general purpose computing device constituting an exemplary system for implementing DNN training technique embodiments described herein.

The DNN training technique embodiments described herein are operational within numerous types of general purpose or special purpose computing system environments or configurations. FIG. 4 illustrates a simplified example of a general-purpose computer system on which various embodiments and elements of the DNN training technique embodiments, as described herein, may be implemented. It should be noted that any boxes that are represented by broken or dashed lines in FIG. 4 represent alternate embodiments of the simplified computing device, and that any or all of these alternate embodiments, as described below, may be used in combination with other alternate embodiments that are described throughout this document.

For example, FIG. 4 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the DNN training technique embodiments described herein, the device should have a sufficient computational capability and system memory to enable basic computational operations. In particular, as illustrated by FIG. 4, the computational capability is generally illustrated by one or more processing unit(s) 12, and may also include one or more GPUs 14, either or both in communication with system memory 16. Note that the processing unit(s) 12 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 4 may also include other components, such as, for example, a communications interface 18. The simplified computing device of FIG. 4 may also include one or more conventional computer input devices 20 (e.g., pointing devices, keyboards, audio input devices, video input devices, haptic input devices, devices for receiving wired or wireless data transmissions, etc.). The simplified computing device of FIG. 4 may also include other optional components, such as, for example, one or more conventional display device(s) 24 and other computer output devices 22 (e.g., audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 4 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying some or all of the various DNN training technique embodiments described herein, or portions thereof, may be stored, received, transmitted, or read from any desired combination of computer or machine readable media or storage devices and communication media in the form of computer executable instructions or other data structures.

Finally, the DNN training technique embodiments described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for training a deep neural network (DNN), comprising:
   using a computer to perform the following process actions:
   (a) initially training a fully interconnected DNN comprising an input layer into which training data is input, an output layer from which an output is generated, and a plurality of hidden layers, wherein said training comprises,
      (i) accessing a set of training data entries,
      (ii) inputting each data entry of said set one by one into the input layer until all the data entries have been input once to produce an interimly trained DNN, such that after the inputting of each data entry, a value of each weight associated with each interconnection of each hidden layer are set via an error back-propagation procedure so that the output from the output layer matches a label assigned to the training data entry,
      (iii) repeating actions (i) and (ii) a number of times to establish an initially trained DNN;
   (b) identifying each interconnection associated with each layer of the initially trained DNN whose interconnection weight value does not exceed a first weight threshold;
   (c) setting the value of each of identified interconnection to zero;
   (d) inputting each data entry of said set one by one into the input layer until all the data entries have been input once to produce a current refined DNN, such that after the inputting of each data entry, the values of the weights associated with the interconnections of each hidden layer are set via an error back-propagation procedure so that the output from the output layer matches the label assigned to the training data entry;

(e) identifying those interconnections associated with each hidden layer of the last produced refined DNN whose interconnection weight value does not exceed a second weight threshold;

(f) setting the value of each of the identified interconnections whose interconnection weight value does not exceed the second weight threshold to zero; and (g) repeating actions (d) through (f) a number of times to produce said trained DNN.

2. The process of claim 1, further comprising the process actions of:

after setting the value of each of identified interconnection whose interconnection weight value does not exceed the first weight threshold to zero, identifying the interconnection weight value having the smallest non-zero value; and establishing the second weight threshold to be the lesser of a prescribed minimum weight value or a prescribed percentage of the identified smallest non-zero interconnection weight value.

3. The process of claim 2, wherein the prescribed minimum weight value ranges between 0.01 and 0.8.

4. The process of claim 2, wherein the prescribed percentage of the identified smallest non-zero interconnection weight value ranges between 20% and 80%.

5. The process of claim 1, wherein the first weight threshold is established as a value that results in only a prescribed maximum number of non-zero-weighted interconnections once each of identified interconnection whose interconnection weight value does not exceed the first weight threshold are set to zero.

6. The process of claim 5, wherein the prescribed maximum number of non-zero-weighted interconnections ranges between 10% and 40%.

7. The process of claim 1, wherein the number of times actions (a)(i) and (a)(ii) are repeated to establish the initially trained DNN ranges between 5 and 50.

8. The process of claim 1, wherein the number of times actions (d) through (f) are repeated to establish the trained DNN ranges between 5 and 50.

9. The process of claim 1, wherein the number of times actions (d) through (f) are repeated to establish the initially trained DNN corresponds to the number of times it takes for the interconnection weights associated with each hidden layer to not vary between iterations by more than a prescribed training threshold.

10. The process of claim 1, wherein the process action of accessing the set of training data entries, comprises accessing a set of training data entries each data entry of which has a corresponding label assigned thereto, and wherein the process actions of inputting each data entry of said set one by one into the input layer until all the data entries have been input once to produce the interimly trained DNN or a refined DNN, comprises, after the inputting of each data entry, setting the values of said weights associated with the interconnections of each hidden layer via the error back-propagation procedure so that the output from the output layer matches a label assigned to the training data entry.

11. The process of claim 10, wherein the process action of accessing the set of training data entries each data entry of which has a corresponding label assigned thereto, comprises accessing a set of speech frames each of which corresponds to a senone label.

12. A computer-implemented process for training a deep neural network (DNN), comprising:

using a computer to perform the following process actions:

(a) initially training a fully interconnected DNN comprising an input layer into which training data is input, an output layer from which an output is generated, and a plurality of hidden layers, wherein said training comprises, (i) accessing a set of training data entries, (ii) inputting each data entry of said set one by one into the input layer until all the data entries have been input once to produce an interimly trained DNN, such that after the inputting of each data entry, a value of each weight associated with each interconnection of each hidden layer are set via an error back-propagation procedure so that the output from the output layer matches a label assigned to the training data entry, (iii) repeating actions (i) and (ii) a number of times to establish an initially trained DNN;

(b) identifying those interconnections associated with each layer of the initially trained DNN whose current weight value exceeds a minimum weight threshold;

(c) inputting each data entry of said set one by one into the input layer until all the data entries have been input once to produce a refined DNN, such that after the inputting of each data entry, the value of each weight associated with each of the identified interconnections of each hidden layer is set via an error back-propagation procedure so that the output from the output layer matches the label assigned to the training data entry; and (d) repeating action (c) a number of times to produce said trained DNN.

13. The process of claim 12, wherein the minimum weight threshold is established as a value that results in only a prescribed maximum number of interconnections being considered when setting interconnection weight values via the error back-propagation procedure.

14. The process of claim 13, wherein the prescribed maximum number of interconnections ranges between 10% and 40% of all interconnections.

15. The process of claim 12, wherein the number of times actions (a)(i) and (a)(ii) are repeated to establish the initially trained DNN ranges between 5 and 50.

16. The process of claim 12, wherein the number of times action (c) is repeated to establish the trained DNN ranges between 5 and 50.

17. The process of claim 12, wherein the number of times action (c) is repeated to establish the initially trained DNN corresponds to the number of times it takes for the interconnection weights associated with each hidden layer to not vary between iterations by more than a prescribed training threshold.

18. The process of claim 12, wherein the process action of accessing the set of training data entries, comprises accessing a set of training data entries each data entry of which has a corresponding label assigned thereto, and wherein the process actions of inputting each data entry of said set one by one into the input layer until all the data entries have been input once to produce the interimly trained DNN or a refined DNN, comprises, after the inputting of each data entry, setting the values of said weights associated with the interconnections of each hidden layer via the error back-propagation procedure so that the output from the output layer matches a label assigned to the training data entry.

19. The process of claim 18, wherein the process action of accessing the set of training data entries each data entry of which has a corresponding label assigned thereto, comprises accessing a set of speech frames each of which corresponds to a senone label.

20. A computer storage medium for storing data for access by a deep neural network (DNN) training application program being executed on a computer, comprising:
  a data structure stored in said storage medium, said data structure comprising information used by said DNN training application program, said information representing a weight matrix having a plurality of columns and rows of weight values associated with interconnections between a pair of layers of the DNN, said data structure comprising:
    a header data structure element comprising,
      a total columns number representing the number of columns of said weight matrix, followed by,
      a series of column index numbers each of which identifies a location in the data structure where information corresponding to a different one of the plurality of weight matrix columns begins; and
    a plurality of column data structure elements each of which comprises information corresponding to a different one of the plurality of weight matrix columns, each of said column data structure elements comprising,
      a total non-zero weight value number representing the number of non-zero weight values in the column data structure element, followed by,
      a series of row identification numbers each of which identifies a row of the column of the weight matrix corresponding to the column data structure element that is associated with a non-zero weight value, followed by,
    a series of non-zero weight values each of which is assigned to a different one of the rows of the column of the weight matrix corresponding to the column data structure element that is associated with a non-zero weight value; and wherein
  said computer storage media consists of at least one of DVD's, or CD's, or floppy disks, or tape drives, or hard drives, or optical drives, or solid state memory devices, or RAM, or ROM, or EEPROM, or flash memory, or magnetic cassettes, or magnetic tapes, or magnetic disk storage, or other magnetic storage devices.

* * * * *